March 8, 1938. E. THORELL 2,110,347
MANUFACTURE OF TYPEWRITER TYPES
Filed Oct. 24, 1935 7 Sheets-Sheet 1

INVENTOR:
Edwin Thorell
BY D. C. Stickney
ATTORNEY.

March 8, 1938.                    E. THORELL                    2,110,347
                        MANUFACTURE OF TYPEWRITER TYPES
                    Filed Oct. 24, 1935            7 Sheets-Sheet 2
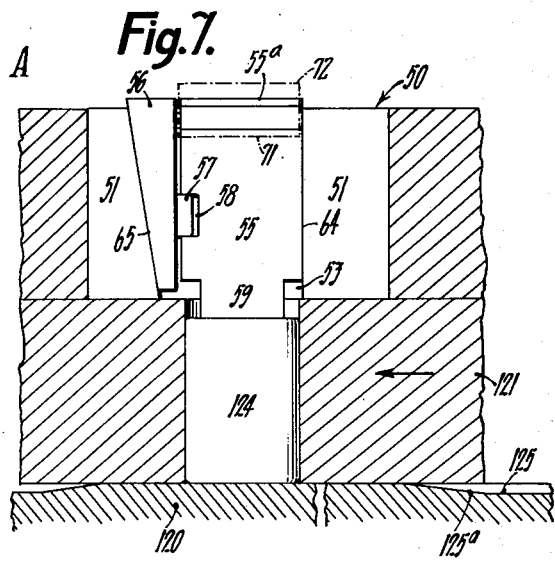
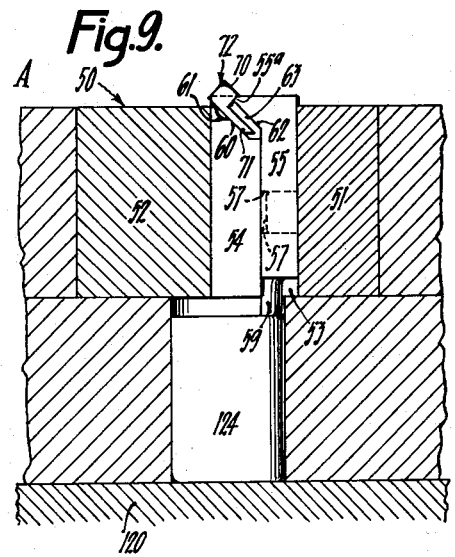
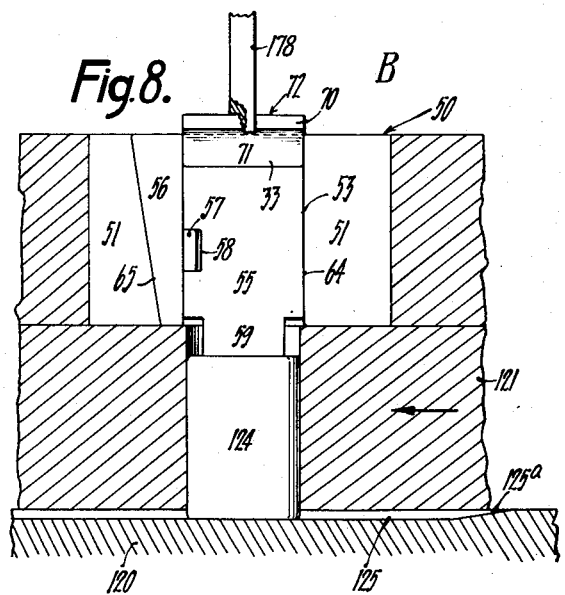
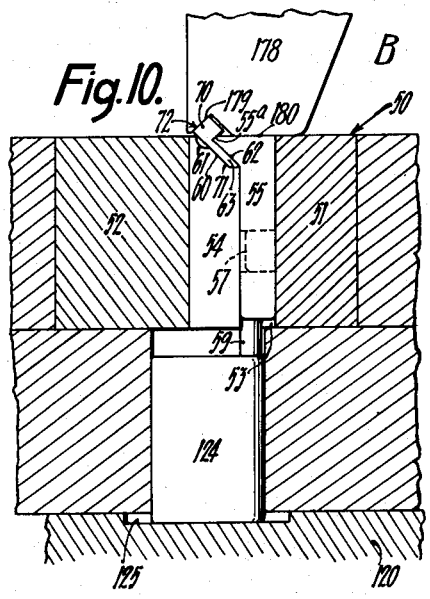
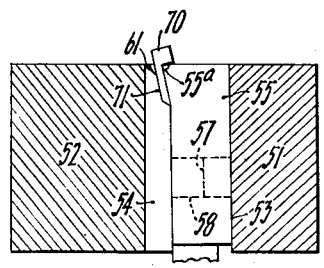
INVENTOR:
Edwin Thorell
BY D. C. Stickney
ATTORNEY.

March 8, 1938. E. THORELL 2,110,347
MANUFACTURE OF TYPEWRITER TYPES
Filed Oct. 24, 1935 7 Sheets-Sheet 3
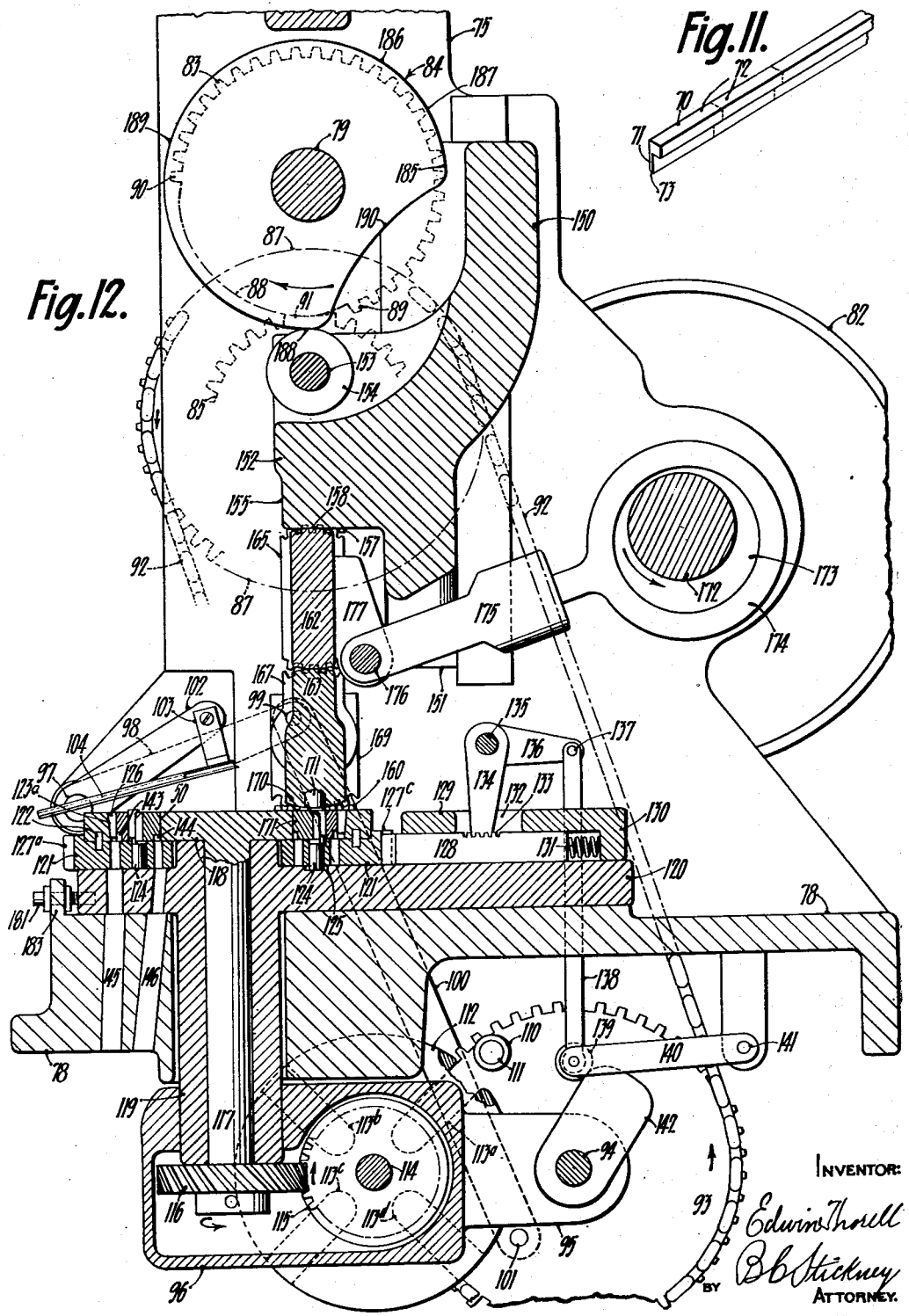

March 8, 1938.
E. THORELL
2,110,347
MANUFACTURE OF TYPEWRITER TYPES
Filed Oct. 24, 1935
7 Sheets—Sheet 4
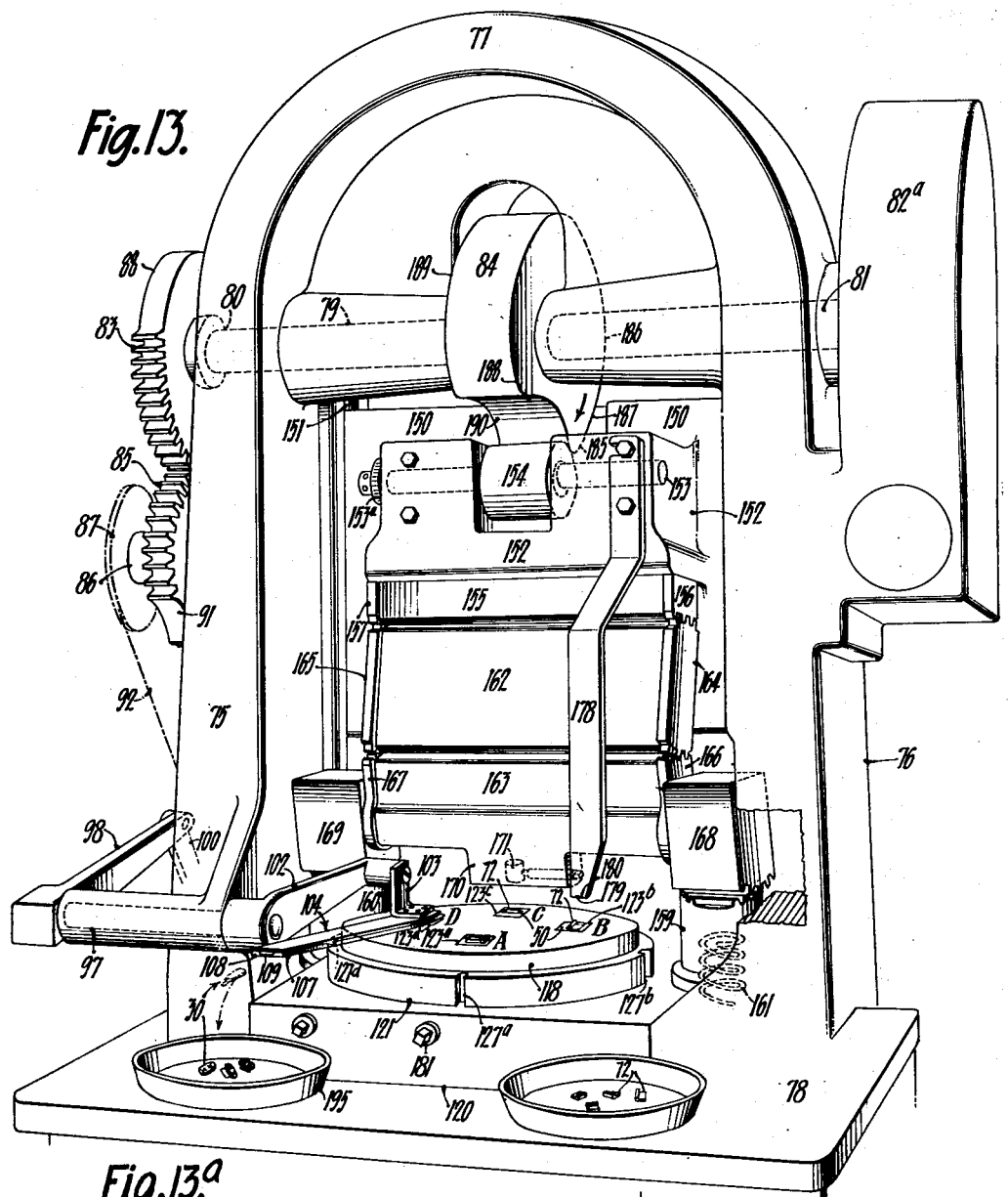
Fig.13.
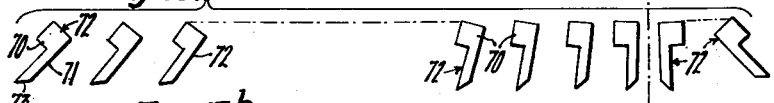
Fig.13.ᵃ
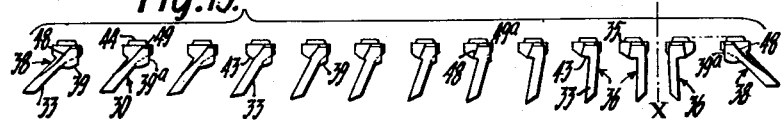
Fig.13.ᵇ
INVENTOR:
Edwin Thorell
BY C.B.Stickney
ATTORNEY.

March 8, 1938.   E. THORELL   2,110,347
MANUFACTURE OF TYPEWRITER TYPES
Filed Oct. 24, 1935   7 Sheets-Sheet 5

INVENTOR:
Edwin Thorell
BY D C Stickney
ATTORNEY.

March 8, 1938. E. THORELL 2,110,347
MANUFACTURE OF TYPEWRITER TYPES
Filed Oct. 24, 1935 7 Sheets-Sheet 6
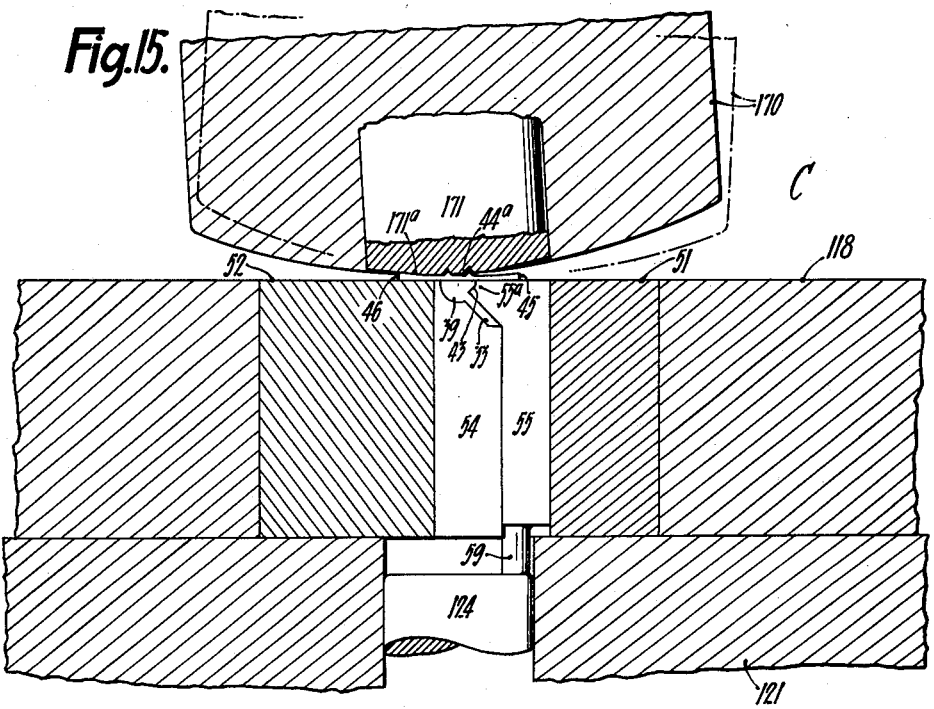
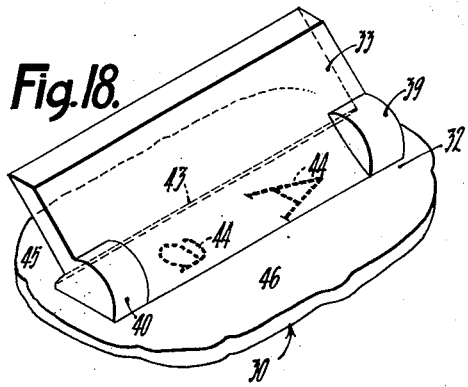
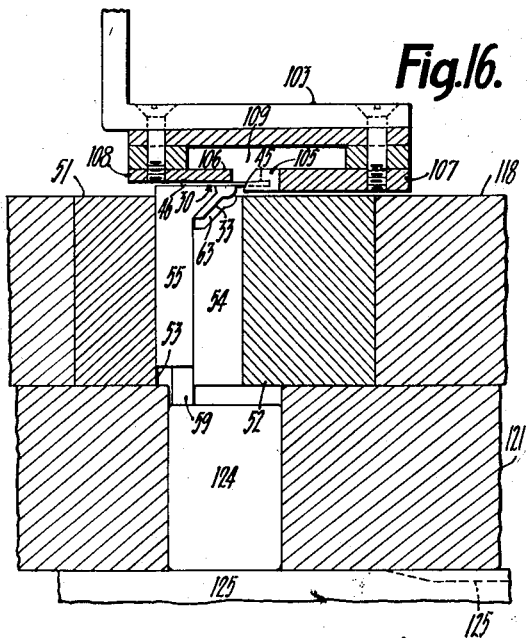
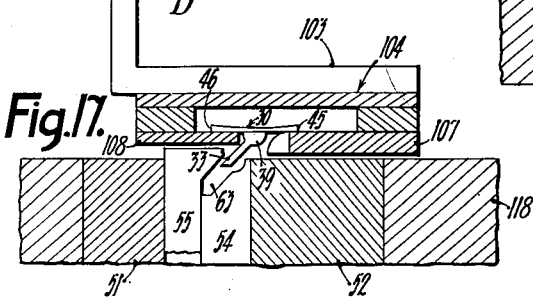
INVENTOR:
Edwin Thorell
BY D. C. Stickney
ATTORNEY.

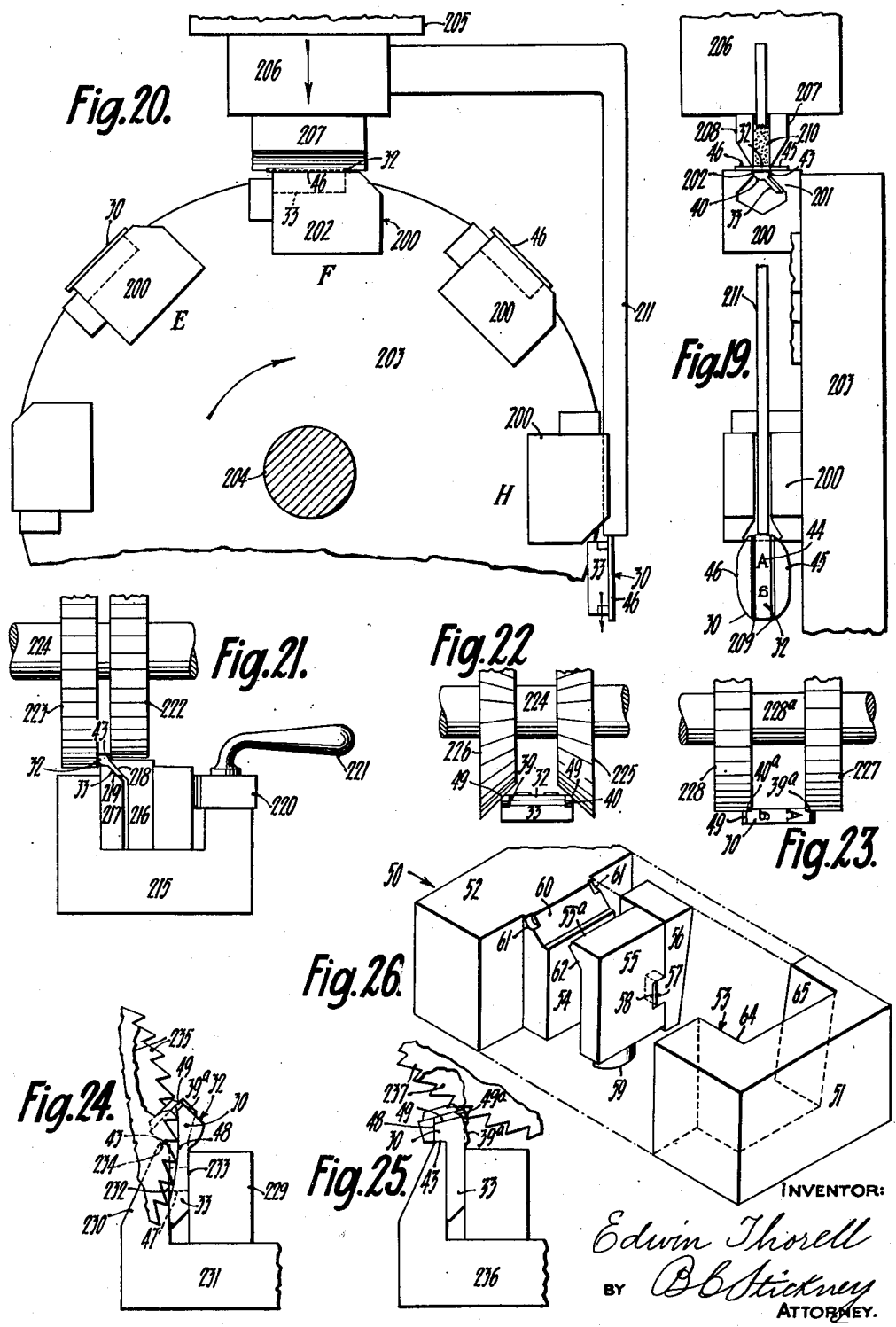

Patented Mar. 8, 1938

2,110,347

UNITED STATES PATENT OFFICE 2,110,347

MANUFACTURE OF TYPEWRITER-TYPES

Edwin Thorell, West Hartford, Conn., assignor to Underwood Elliott Fisher Company, New York, N. Y., a corporation of Delaware Application October 24, 1935, Serial No. 46,570

8 Claims. (Cl. 101—401.5)

This invention relates to a process for making types which may be used in typewriters of the noiseless or similar class of machines. In this class of typewriting machines, the face of the type may be located in an angular relationship with the grip or shank which is riveted or soldered to a type-bar, usually connected by a system of levers to a key on the keyboard of the machine.

In their normal position, the types may be located respectively in a small arc of a circle, a short distance in front of the revolving platen. When one of the keys on the keyboard is depressed by the operator the corresponding type-bar is moved by means of the system of levers connected thereto, thus moving the selected type to the center of a guide usually located at the center of the machine immediately in front of the platen.

Due to the location of the types in a substantially circular arc, as previously described, the shanks of said types are usually located in a direction substantially radial to said arc. When the type-bar is moved toward the platen, the type-head is in a position substantially parallel to the vertical platen plane. There are usually forty or more different types on the conventional machine, twenty or more of which may be located on each side of the center line of the machine, in a circular arc, as previously described. On the central types, the position of the type-head is usually substantially parallel to the vertical plane of the platen, and the path of said type-head in moving toward the platen is substantially perpendicular thereto. Thus, on the central types, the type-head and shank are substantially perpendicular to one another.

The types located at the outer ends of the circular arc have the type-faces substantially parallel to the vertical plane of the platen, with their shanks substantially radial to the circular arc. The type-head and shank thus are in an acute angular relationship with one another. On the intermediate types, the face of each type, when it strikes the platen, is parallel to the plane of said platen. The shanks, however, are substantially radial to the aforesaid circular arc. The angle between the type-head and the shank varies in the respective types from the substantially perpendicular relationship common to the central types to the very acute angle of the outer types. As the types may all be located symmetrically about the center line, there are thus ten or more different angular relationships between the type-heads and the shanks of the respective types. On a machine of this class, the angle between the type-head and shank of a type on one side of the center line is substantially equal to the angle of the corresponding type on the opposite side of the center line. The number of different angles and the number of characters used vary of course, according to the different machines used; and the language of said characters.

Heretofore types of this kind were rolled in multiple on a large blank. After rolling the type-face it was necessary to mill the various angles on the backs of the type-heads and to form each shank separately. Due to the fact, as previously stated, that the angle between the type-head and shank on each type differs from that of the adjoining type, it was necessary to have many different sets of form-cutters to mill the shanks and the backs of the type-heads. It was also necessary to employ a number of different sets of fixtures or holding devices to retain the blanks in their correct angular relationship during the process of forming the shanks. After the shanks were formed, the type-heads were cut apart, forming the individual types, and the subsequent machining and finishing operations performed.

Said process presented considerable difficulty and proved costly in both the initial equipment installation required and in its operation. It has also proven to be wasteful of material.

An object of this invention is to evolve a process for making types in a simple, inexpensive and accurate manner. Thus there is evolved a novel method of rolling the type-face and character of each type from a novel individual blank in a substantially continuous novel process, said rolling operation being performed on a rolling press with novel equipment.

The type-blank-rod-rolling step of this invention produces each character in a substantially finished form, and at the same time forms the head of the type in the form of wings extending from the central shank, said wings containing the head in substantially the required thickness, with the excess material at the sides. After the rolling process there are taken the steps of flashing, milling and punching, all of which are hereinafter described in detail. There are additional steps of hardening, numbering and plating. All operations are comparatively simple, and the novel apparatus for clamping the types and performing the various machining operations is of a comparatively simple design.

The novel blank rod preferably used is rolled with a thick head, having a depending shank of substantially the shape and thickness required for the finished type, and the blank rod is cut into strips of the length required for each type. Due to the fact that the blank is left substantially in the initial form, and very little excess material is formed on the head during the rolling process, the use of this type of blank results in economy of material.

It is thus apparent that the invention includes a comparatively simple individual rolling process, without taking cumbersome steps of shank-forming and head-severing, and produces the required result in a very simple manner.

The following description details various steps of the novel process of making the aforementioned types, as well as the novel machines and holding devices and other appliances employed in carrying out said process.

The type-blank consists of a length of stock having a longitudinal shank. A shaped rod is cut into appropriate lengths for the individual types. The shape may bear resemblance to a square wire or rod, from one face of which projects a longitudinal flange. The stock furnishes the metal for the type-faces, while the flange furnishes the material for the type-shanks.

In the noiseless type of machine, for which these types are designed, the type-carriers work in vertical planes, which converge to the printing point. By its key, each carrier is thrust rearwardly against the platen. The type is attached to its carrier by a shank which is in the plane of the carrier, while the type-face fits to the platen. The shank is, therefore, at an angle to the type-face. The angles of different shanks vary, in consonance with the position of the individual type-carrier in the system. At the middle of the machine, the shank is at about a right angle to the type-face. At the extreme sides of the system, the shank is about 45 degrees to the type-face. The angles are graduated, and increase in sharpness from the middle to the sides of the type-bar system.

Each type, however, is formed from one blank, with its flange or shank, and the blanks are the same for all or many types. The position of the shank portion with reference to the stock portion is not changed, but the direction of pressure of the type-dies upon the stock portion varies for different types, owing to the different positions in which the similar blanks are mounted in the press and presented to the type-die.

The type-die, which usually has a rolling motion, keeps the same position and motion in the machine, but the blanks are mounted in a variety of positions, and presented in correspondingly different ways to the type-dies. Accordingly, the blank-dies have recesses in which to mount the shanks, and are provided with means for supporting the stock at the type-rolling operation.

By simply inserting any blank in the desired mount in the press, to give the blank the desired position, and then by rolling the type-die thereover, there is produced a type, having a rather broad lateral spread or flash, overlying the top surface of the mount or blank die. With different rolling dies there are used different mounts or blank-holder dies, the mounts being distinguished from one another mainly by the different positions in which they hold the blanks respectively.

There are enough blank-holding dies to give the right positions to all the types used on one side of the printing point in the typewriter. The same dies are used for the remaining half of the types, for which purpose they are merely reversed in positions in the press.

The product of the first operative steps is a type having a flash at an angle to the shank. In most instances the angle is acute.

By this step there is also left or formed, at the ends of the blank, a quantum of stock from which, at subsequent operations, there are shaped the guiding portions that enter the fixed center guide of the typewriter, and thereby change the direction of movement of the advancing type from an acute angle to a right angle; the concluding portion of the stroke of every type being perpendicular to the platen.

The next step is to score or groove the type, thereby demarking the flash portions from the sides of the type itself.

Subsequently these side flash portions are removed, for the next operation is to trim the sides of the types by a milling cutter, which, as soon as it strikes the type, breaks off the flashes along the scored lines.

The portions of flash remaining at the top and bottom of each type are next milled off, by a milling operation which forms a bevel or chamfer on the type-ends, to serve as means for guiding the types into the fixed central type-guide of the typewriter. Said fixed guide is in the form of a rectangular slot with a central enlargement.

The next operation is to remove a little from each end on one side of the type, thus making the same a trifle narrower at its end to fit the one side of the fixed type-guide of the typewriter against which the type is thrust by the type-bar.

Next rivet holes are made for use in attaching the finished type to the type-bar.

There are then made cuts in the upper and lower ends of the type, in the nature of clearances, to permit the type to enter the fixed guide, coming to rest against the side of the fixed guide to which the type is thrust by the type-bar.

The eight central types, that is a group of four on each side of the central line of the machine, then have clearances cut in their top and bottom side portions, these clearances preventing the types fouling upon the type-guide as they approach the platen.

Other features and advantages will hereinafter appear.

In the accompanying drawings,

Figure 7 is a side elevation of the opened die, with one jaw removed, showing the die-opening plunger and the locking wedge.

Figure 8 is a side elevation of the die, with one jaw removed, showing the die-closing member forcing the blank into the die and the wedge tightened against the die-head.

Figure 9 is a section through the die utilized in holding the blank during the process of rolling. The die is shown in the open position with the blank in position.

Figure 10 is a section through the die of Figure 9, showing the die closed by the action of the die-closing member.

Figure 11 is a perspective view of the blank bar stock as it is received from the rolling mill, with the type-segments illustrated by dotted lines.

Figure 11ᵃ shows a die for a central type.

Figure 12 is a partial section and side elevation of the rolling press, showing the die and blank in position for the rolling operation.

Figure 13 is a general perspective view of the rolling press used in performing the rolling operations on the type-head from the blank to the rolled type.

Figures 13ᵇ and 13ᵃ show the types and the blanks from which they are produced. The blanks are alike, but they are shown in angular positions corresponding to the positions occupied in the various graded dies.

Figure 14:
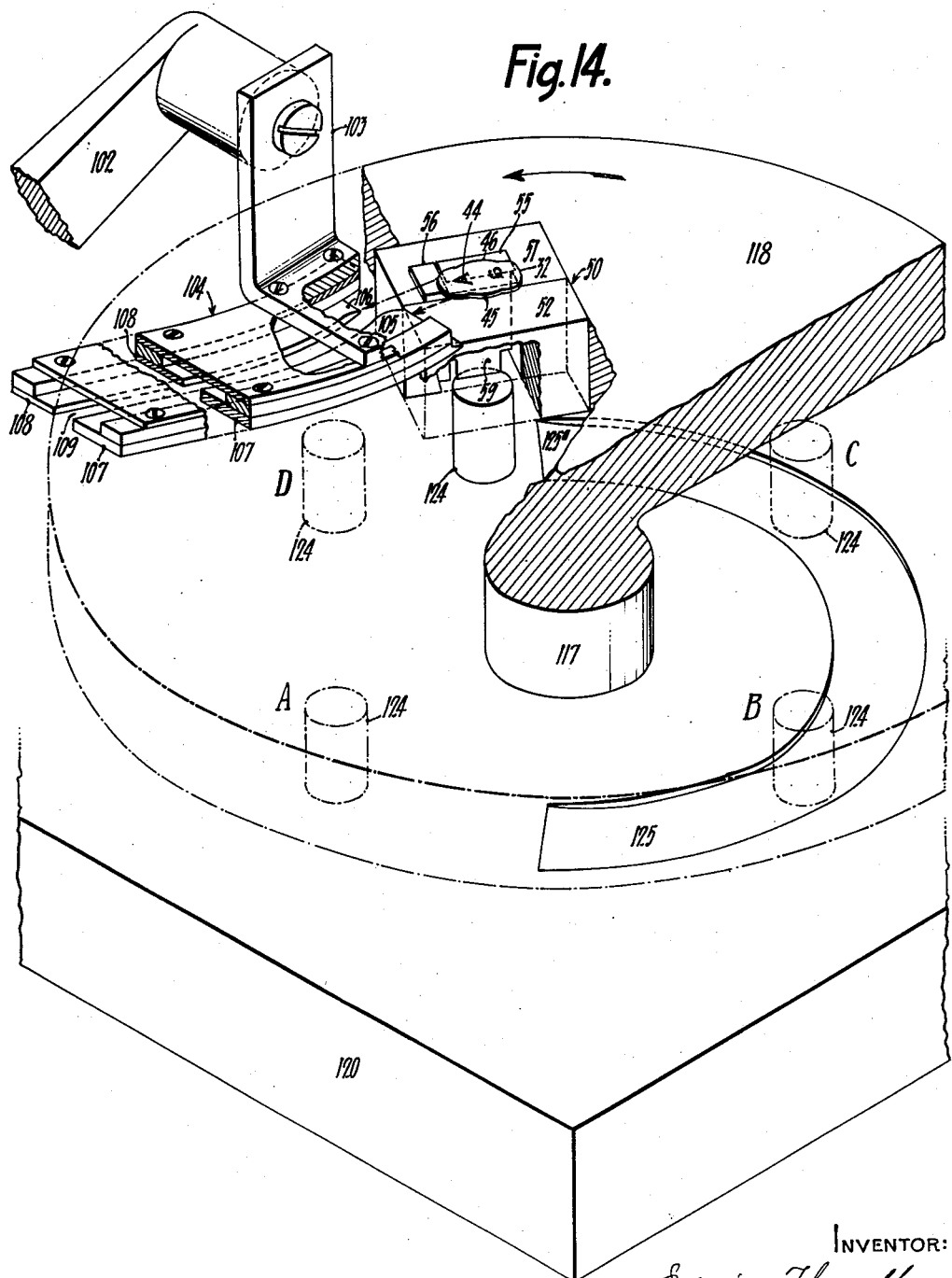

Figure 14 is a perspective which shows the grooved ejector used in removing the rolled type from the press after the completion of the rolling operation.

Figure 15 is a partially sectional representation of the type-blank being rolled.

Figure 16 is a diagrammatic front elevation of the die in the open position, showing the pick-off fingers in position to lift the rolled type out of the die.

Figure 17 is similar to Figure 16, showing the rolled type being carried on the pick-off fingers.

Figure 18 shows the rolled type after it is delivered from the rolling press.

Figure 19 is a front elevation showing the vise used in holding the rolled type and the tool used in scoring the type-head in preparation for removal of the flash.

Figure 20 is an end elevation of the wheel which mounts the vises of Figure 19, showing additionally the scoring tool and the ejector having ejected a scored type-head.

Figure 21 shows the vise used in clamping the type after the scoring operation; the type being in position for milling the sides of the type-head.

Figure 22 is a representation of the milling operation for forming the bevels on the ends of the type.

Figure 23 is a representation of the operation for milling the guiding lugs at the ends of each type.

Figure 24 is a representation of the clearance milling operation milling both ends of the shank so as to clear one side of the type-guide.

Figure 25 is a representation of the bevel milling operation (used on the eight centrally located types only).

Figure 26 illustrates the parts separated that make up the die.

Figure 2:
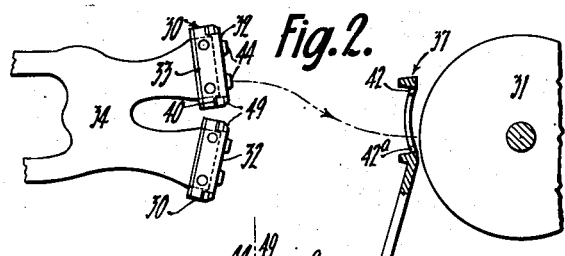
Figure 2 is a partial elevation of certain of the parts contained in Figure 1, showing two types mounted on a single type-bar, a common feature of noiseless typewriters.
Figure 1:
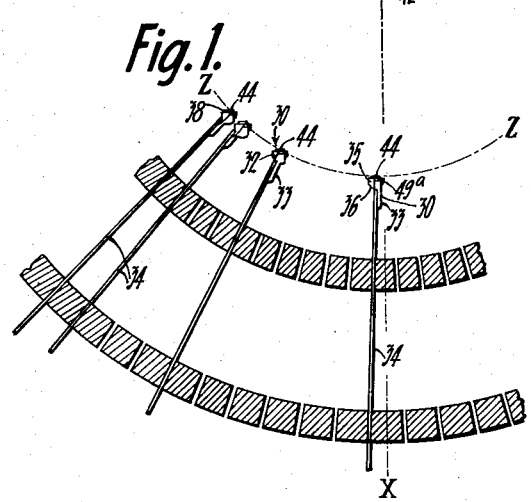
Figure 1 is a diagrammatic plan view representation of a portion of a typewriter of the noiseless class, showing the position of several types with relation to the platen, the types being in their home position.

In a typewriter of the noiseless class, the set of types 30 is arranged in a substantially circular arc Z—Z, as shown in Figure 1, a short distance forward of the platen 31. The types on one side of a center line X—X of the machine are symmetrical with similarly located or complementary types on the opposite side of the center line. The type-heads 32 are substantially parallel to the vertical plane of the platen.

Figure 3:
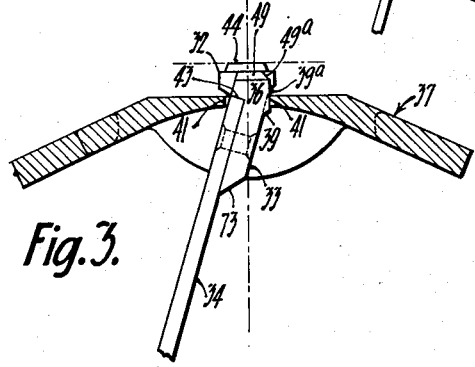
Figure 3 is a plan view of one of the centrally located types in printing position against the platen, with one of the directional lugs of the type-head in contact with an edge of the type-guide.
Figure 4:
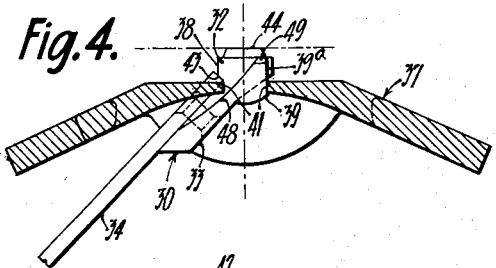
Figure 4 is a similar representation of one of the end types.

The respective shanks 33 of the types are riveted or otherwise secured to type-bars 34, located radially with respect to the arc Z— Z. The type-heads 35 of the central types 36 (Figures 1 and 3) are substantially perpendicular to their shanks 33, as the path of these types is approximately perpendicular to the plane of the guide 37. The angle between the type head and shank of individual types becomes increasingly acute as the position of the type-bars ranges from the center to the ends of the arc, the most acute angle naturally being at an end-type, as 38, Figures 1 and 4.

Figure 5:
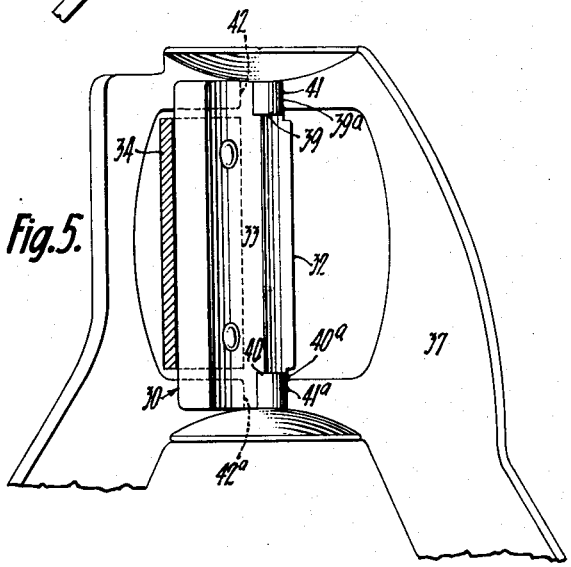
Figure 5 is an elevation, partially in section, showing the type-guide, with a type-head in printing position.

When a key on the keyboard is depressed, the corresponding type-bar 34 carries the type from its home position in the arc Z—Z to a position where it contacts the guide 37. The edges 39ᵃ, 40ᵃ of the lugs 39, 40, Figure 6, of a type-head contact edges such as 41, 41ᵃ of a pair of notches 42 and 42ᵃ formed in the center of the guide 37, see Figures 3, 4, and 5. The purpose of this contact is to deflect the path of the type-head, changing the direction of its travel from an angular relation to the platen to one substantially perpendicular thereto, thus insuring the correct printing pressure and position. It is obvious, therefore, that the angle given such edges must co-operate with the angle between type head and shank.

The novel die 50 (see Figures 11ᵃ, 15 and 26) used in co-operation with the rolling press to form the type head and shank and give the correct angular relationship between type head and shank preferably has two jaws 51 and 52. Jaw 51 is formed with a vertical rectangular channel 53 having a vertical side 64 and a tapered side 65, the latter sloping uniformly from top to bottom. A vertical rectangular abutment 54 integral with jaw 52 is formed to enter and partially occupy channel 53 when the two jaws are brought into intimate contact, one side of abutment 54 contacting the vertical side of channel 53 so as to leave a substantially L-shaped opening remaining.

A slidable die-head 55 having a width substantially equal to that of the abutment occupies the space immediately in front of the abutment. Die-head 55 has formed therein a longitudinal shoulder 55ᵃ, which, during the rolling operation, will form a shoulder 43 on the under side of the finished type 30. This shoulder serves as a gage for all of the later milling operations. The thickness of the type from the top of the shoulder 43 to the surface of the type-character 44 is the same for all of the types. A locking wedge 56 (Figures 7, 8, and 26) having one side tapered to match that of channel 53 occupies the remaining space and serves as a means of locking die-head 55 in position. The wedge 56 and die-head 55 are operatively associated by means of a tongue 57 formed on the wedge, engaging a suitable recess 58 in the side of the die-head. An extension 59 depending from the bottom die-head 55 to a point below the bottom surface of jaws 51 and 52 serves as a means of disengaging the die-head and the wedge from contact with the jaws 51 and 52, an upward pressure on extension 59 lifting the die-head 55 and associated wedge 56.

For rolling any type in which the type-head 32 forms an acute angle with the shank 33, such as an end-type 38, a portion of the top of the abutment 54 on the jaw 52 of the die is chamfered at 60, as indicated in Figure 9, to an angle corresponding to the angle between the type-head and the shank of the type, the length of such chamfer being substantially equal to the type-shank. Two substantially semi-cylindrical grooves, as 61, are also milled out at the top of the bevelled surface of the abutment 54 to provide for the formation of the lugs 39 and 40 at the ends of the rolled type 30 (see Figure 18), which lugs will later be machined, to form the direction guiding lug faces 39ᵃ, 40ᵃ which contact the edge of the guide 37 (see Figures 3 and 4). The surface 62 below the top of the die-head 55 is bevelled to a corresponding angle, to overlie the chamfer 60 in parallel relationship, the space 63 (Figure 10) between the surfaces when in operating position being equal to the thickness of the type-head shank 33, see Figure 15.

For rolling an oppositely positioned end-type, in which the angle between the head and shank is the same as that of type 38, but oppositely disposed, the same die may be used. The die 50 when inserted in the die-bed 118 is, however, reversed in order that all of the characters may be engraved on the rolling dies 171 in a uniform manner, and the rolling dies uniformly mounted in the press. For any other pair of types, the angle between the respective heads and shanks will be correspondingly equal for each type although less acute than the angle between the head and shank of the end-type 38, and the die-head 55 and the abutment 54 of the die 50 are correspondingly beveled to the appropriate angle.

There may thus be eleven or more different sets of dies 50, depending upon the number of angles required between the type heads and shanks, to form a set of type. Reversing the dies allows the press to roll the forty-two or more types required per machine using one quarter the number of dies. There are two types on each type-bar. Each bar has a substantial duplicate on the opposite side of the printing center and having a like angle.

Figure 11 shows the blank bar preferably of cold-rolled drawn steel, as it is received from the rolling mill, with the head 70 flush with one side of the thin shank 71 and substantially perpendicular thereto. This head may be of square, rectangular, T-section or of other suitable cross-section, depending upon the detailed method of operation to be followed, in making the type. The shank 71 is bevelled at its lower, outer edge, as at 73.

This bar is cut into blanks 72 of the proper length for the forming of the finished type. The head 70 of the blank 72 contains enough material to form the type-head and character. As the bar from which this blank is cut is cold-finished, the thickness of the shank 71 is uniform and practically equal to the finished type-shank thickness required. Only one form of type-stock bar is required for the manufacture of all of the types used in the typewriter.

When the die is opened as at Figure 9 by raising the die-head 55, the two beveled surfaces 60 and 62 provide a space 63 for the insertion of the shank 71 of the blank 72. The die is closed by lowering the die-head 55 and gripping it between the sides of the channel 53 by means of the wedge 56, see Figures 7 and 8. When the die is closed, the bevelled surface 62 of the die-head and 60 of the jaw-abutment grip the shank 71 tightly and hold it in position for the rolling operation.

The rolling press, Figures 12 and 13, has two vertical columns 75 and 76 connected by an arch 77 at the top. These vertical columns are fastened at their respective bases to a table or machine base 78. A shaft 79, preferably journaled at 80 and 81 in the two vertical columns 75 and 76, is connected at one end to an electric motor or other power source 82 by a gear train 82ᵃ or other suitable means of transmission, and is fitted at its opposite end with a timing gear 83. A cam 84 is mounted at the center of the shaft 79 between the two columns. The timing gear 83 meshes with and drives a gear 85 journaled on a shaft 86, mounted at the outside of the column 75. A chain-sprocket 87 is mounted on shaft 86 so as to rotate with the lower gear 85. Over an arc 88 extending between the teeth 89 and 90 on the gear 83 said gear is blanked. The lower gear 85 is similarly blanked over an arc 91 so as to be intermittently driven by gear 83. The blanked portion of gear 83 is arranged to act as a detent as it engages the blanked portion of gear 85, thus preventing any rotation of gear 85 although gear 83 is constantly rotating. The sprocket 87 is connected by a suitable chain drive 92 to the lower sprocket 93, said sprocket 93 being carried by a shaft 94 suitably journalled in an extension 95 from a gear chamber 96.

A rock-shaft 97 is suitably journalled to the left column 75 of the machine, and carries at its outer end a rearwardly extending arm 98 which is pivotally connected by a pin 99 and a rigid link 100 to a pin 101 on the web of sprocket 93. The inner or machine end of shaft 97 has fixed thereto an arm 102 which at its rear end is removably fastened by a bracket 103 to an ejector 104.

A roller 110 is mounted on a pin 111 fixed to the web of sprocket 93. A Geneva follower 112, which has cut therein or attached thereto four equally spaced radial slots 113ᵃ, 113ᵇ, 113ᶜ, 113ᵈ, is secured to a rotatable shaft 114 mounted on the gear chamber 96. A helical gear 115 located within gear chamber 96 is also mounted on the shaft so as to be driven by Geneva follower 112. Gear 115 is in mesh with a similar helical gear 116, secured to a vertical shaft 117, which at its upper end is secured to or integral with a die-bed 118.

As the gear 85 is intermittently driven by the constantly rotating gear 83, the sprocket 93 is likewise intermittently driven. At a point during the rotation of sprocket 93, the roller 110 will slidably engage a slot in the Geneva follower 112, urging the Geneva follower and its associated gear 115 into a quarter revolution. As the shaft 117 is secured at its upper end to the die-bed 118, and as the shaft is driven by the gearing 115 and 116, the die-bed 118 will thus be rotated in counterclockwise quarter revolution steps. The timing mechanism is so arranged as to have the idle periods of die-bed 118 equal to the duration of the type-rolling process.

It will be understood that although the preceding description has specifically mentioned a four position intermittent movement of shaft 117, an intermittent movement having any reasonable number of stations can be accomplished by a suitable alteration of the timing mechanism.

The vertical mounting 119, which depends from the stationary bed 120 and carries gear chamber 96 at its lower end, journals shaft 117. The bottom of the stationary machine-bed 120 rests on the top surface of the base 78. The bottom of the revolving bed 121 bears against the top of the stationary bed 120 and is thereby maintained in a horizontal position. The die-bed 118 rests on the upper surface of the revolving bed 121 and is connected to it as by pins 122 so as to cause the simultaneous rotation of the revolving bed.

The die-bed 118 has four or more operating stations A, B, C, and D, Figure 13. Where there are four stations they are located 90° apart and four square or rectangular holes 123ᵃ, 123ᵇ, 123ᶜ, 123ᵈ, are cut in the die-bed to receive the dies 50. The bed is revolved intermittently by means of the train of gears and the chain-drive previously described. The extension 59 depending from the lower end of the die-head 55 is provided for lifting the die-head and opening the die. For each die, a plunger 124 is slidably fitted in a cylindrical hole in the revolving bed 121, the upper end of said plunger abutting the end of the extension 59 on the die-head. The lower end of the plunger 124 rides in a cammed channel 125, preferably cut in the stationary bed 120 below the revolving bed 121. The cam 125ª raises the plunger 124 and lifts the die-head 55, thus opening the die at a predetermined point in its path, usually immediately ahead of station D. The die remains open until it has passed station A where the operator inserts the blank 72 in the opened space 63 between the beveled surfaces 60 and 62.

Between the outer edge of any rectangular hole, as 123ª in the die-bed 118, and the jaw of the die 50, a wedge 126, Figure 12, which tapers in thickness from top to bottom, is inserted. This wedge locks the die in its position in the die-bed.

In rolling a type in which the shank 33 inclines in an opposite direction from that shown in Figure 18, but where the angle between the type-head 32 and shank 33 is the same, the same die 50 is used. It is necessary only to reverse the die in the hole 123ª, the wedge fitting against the jaw of the die, in the same manner.

The outer circumference of the revolving bed 121 is slotted at four equally spaced points 127ª, 127ᵇ, 127ᶜ, 127ᵈ, corresponding to the locations of the die-holes 123ª, etc., in the bed. A detent-bar 128 preferably rectangular and having a square nose to engage the slots 127ª, etc., is slidably fitted in a suitable guide 129, preferably an inverted channel-member having a closed rear wall 130 and secured to the stationary bed at the rear of the machine. A compression spring 131, interposed between bar 128 and the rear wall 130 of guide 129, reacts to urge the detent-bar 128 forwardly.

The guide has a suitable opening 132 to expose rack-teeth 133 cut into the upper surface of detent-bar 128 and to provide access for the actuating lever 134, the lower end of which has teeth in engagement with the rack-teeth 133. The actuating lever 134 may be in the form of a bell-crank, pivoted on a shaft 135 suitably secured to the machine-frame. The rearwardly extending arm 136 is also secured to shaft 135 and is pivotally connected by means of a pin 137 and link 138 to a cam-roller 139 mounted on an arm 140, which is pivoted at 141 to the machine-bed 78. Cam 142 mounted on shaft 94 so as to rotate with the sprocket 93 imparts a substantially vertical motion to link 138, which is translated into a horizontal movement of detent-bar 128.

The cam 142 engages the roller 139 immediately prior to the engagement of roller 110 with a slot of the Geneva follower 112, so as to withdraw the detent-bar 128, in opposition to spring 131, prior to and during the rotation of the die-bed 118 to the next operating station. When the next operating station is reached, the engagement of cam 142 and roller 139 will terminate, and spring 131 will be free to drive the detent-bar 128 into engagement with a slot, as 127ᶜ, so as to prevent the further rotation of the die-bed during the rolling process.

As indicated on Figure 12, the bottom of the die 50 has at its ends two notches 143 and 144. Two holes 145 and 146 which extend through the base 78, the stationary bed 120 and the revolving bed 121 are located so that the front hole 145 is located at the juncture between the front notch 143 and the wedge 126, and the rear hole 146 corresponds to the position of the notch 144, when the die is at the front of the press-station A. A suitable rod or pin (not shown) may thus be inserted through the hole 145 in order to raise the wedge 126 and the front jaw of the die so as to remove the die 50 from the press. The other jaw may be likewise lifted by inserting a pin through the rear hole 146.

When the die 50 is reversed, as previously described, notch 144 and wedge 126 are located over the front hole 145.

A sliding frame 150 is supported at its sides by channels 151 formed in or attached to the vertical columns 75 and 76. The channels guide frame 150 in free vertical movement. In a forwardly extending yoke 152 integral with frame 150, a horizontal shaft 153 is fitted, at the center of which, immediately below the cam 84, a cam-roller 154 is journaled, so as to rotate freely on shaft 153. Shaft 153 is eccentrically mounted in frame 150 so as to provide for a vertical adjustment of roller 154, the adjusting means comprising a rotatable wheel 153ª.

The lower portion of the yoke 152 is formed into a rack 155 having toothed extremities 156 and 157 and a planar central surface 158.

Two supports 159 and 160 with rack-toothed surfaces are located at the machine-bed 78 and are disposed in the same vertical plane as the rack 155 but are spaced outside of the toothed rack-extremities 156 and 157. At least one of the supports, such as 159, is mounted on a suitable spring 161 which urges the support in an upward direction.

A pair of rollers 162 and 163 having toothed extremities 164, 165 and 166, 167, mesh with each other and have their curved surfaces in contact. The upper roller 162 contacts the plane surface of the rack 155, with the roller-teeth 164, 165, meshing additionally with the rack-teeth 156 and 157. The toothed bearings 168 and 169 of the lower roller mesh with the rack-teeth of the supports 159 and 160.

Because the rollers are given only a limited rotation, the front and rear surfaces can be planar, as shown in Figure 13. The bottom surface of the lower roller 163 is additionally cut away, leaving only a central portion 170 of full radius, in which portion the character-forming die 171, having a portion of its outer surface equal to the width of a type 30 shaped to conform to the roller surface, is removably inserted and suitably locked. The character-forming die 171 (see Figure 15) has female impressions 44ª, Figure 15, of the required type-characters 44 cut into its surface 171ª, so as to form the characters in relief on the type-head blank 72 with the application of suitable rolling pressure.

A shaft 172, journalled at the rear of the press, has an eccentric 173 fitted thereon, the shaft and eccentric being continuously rotated during the press operation by a gear-train or other connection to the outside power source 82. The gear-train 82ª, which serves to connect the shaft 79 to the power source 82, preferably is so designed as to give a 25-1 ratio between the rotation of eccentric 173 and shaft 79. An arm 174, journaled on the eccentric 173, is pivotally connected by means of a link 175 and a pin 176 to an arm 177 fixed to the rear side of the upper roller 162. The reciprocal motion given to the arm 174 by the eccentric thereby imparts a forward and rearward rotation to the rollers 162 and 163, with the upper roller 162 rolling against rack-surface 158, lower roller 163 rolling against the type-blank 72 and the various meshing gear-teeth and rack-teeth assuring a positive alignment of the rollers.

A downwardly-extending die-closing member, preferably consisting of an arm 178 fastened to the yoke 152, has a rectangular lower extremity parallel to the die-bed 118 and disposed exactly over station "B." The lower extremity has a notch 179 cut therein to engage the head of the type-blank 72 and has a flat surface 180 to engage the raised die-head 55.

At station "B", the depth of the cammed channel 125 in which the die-opening plunger 124 rides has reached a point which will permit the closing of the die-head 55 and the correct alignment of the blank 72 in the die 50. The die-head 55 with the associated wedge 56 may drop by gravity, and the blank 72 may then be ready for the rolling operation.

However, the die-closing operation may be made positive by the downward motion of the arm 178, which occurs as frame 150 descends during the process of rolling a blank 72 at the next station "C." The die 50 therefore is positively closed and locked at station "B" by the pressure of arm 178 on the die-head 55, which is forced down flush with the surface of the die 50. As the die-head 55 and the locking wedge 56 are operatively associated, closing the die serves additionally to lock it.

For aligning the die 50 relatively to the face of the rolling die 171, there is provided an adjusting device in the form of a screw 181, Figure 12. The screw has collars which straddle a stationary ledge 183, and when turned the threaded rear end of the screw shifts the stationary bed 120 with the die-bed 118 forwardly or backwardly. Suitable means (not shown) are provided to maintain the adjustment. The vertical mounting 119, the top of which is connected to or integral with the stationary bed 120, is also moved with the die-bed 118 and the bed 120. As the die-bed 118 is attached to the vertical shaft 117, which is in turn journaled within the vertical mounting 119, any horizontal movement of the stationary bed 120 is transmitted through shaft 117 to die-bed 118, and consequently to the die 50, holding a blank 72. Similar adjustment is provided at one side of the stationary bed to laterally adjust the die 50 with relation to the rolling die 171, the position of which is substantially fixed with relation to the center of the press. In this manner, the blank 72 may be moved to the exact center of the rolling die to insure a correct relationship between the blank and the rolling die 171 during the rolling operation.

The contour of the cam 84 is as follows: The radius of the cam from the center 79 to the cam-surface increases continuously from a starting point 185 until a suitable point 186 is reached, thus providing a ramp 187 for starting the rolling operation. From the point 186 on the cam-surface to the point 188, the radius is substantially constant, providing a dwell 189 during which the rolling operation is completed. After the point 188 leaves the roller 154, there is a deep depression 190 in the cam-surface to permit the rolling die to raise under action of the springs 161, to clear the die 55 and the blank 72 while the die-bed is turned to another station.

When the die 50 has been positively closed by the action of arm 178, the next quarter revolution of die-bed 118 brings die 50 and blank 72 into operating position under the rolling die 171, which with roller 163 is continuously being rocked back and forth. The cam 84, continuously rotating with shaft 79, brings the point 185 on its surface into engagement with the cam-roller 154, exerting a downward pressure on the rolling die 171, through medium of yoke 152 and the abutting rollers 162 and 163. As cam 84 continues to rotate, the constantly increasing radius of the ramp 187 exerts a correspondingly increased pressure on the die 171 and the blank 72. The combination of the increasing pressure and the rocking motion of the die 171 works the metal of the type-bar blank-head 70 into the impressions formed in the die 50, imparting the shape of the die to the type-blank metal, and giving the shank 33 substantially its exact shape, and its exact angle in relation to the now rolled type-head 32, see Figures 15 and 16. When the point 186 on the cam-surface is reached the shape of the type-head and shank is substantially completed and the characters 44 in relief on the surface of the type-head 32 have taken shape, see Figures 15 and 16. During the dwell period between the points 186 and 188 on the cam-surface, the pressure of the rolling die on the type practically becomes zero and the characters 44 are given their finished accurate form. The wings 45, 46 on the rolled type-head were in the process of formation throughout the rolling operation, said wings being composed of the flash, or excess metal. Point 188 on the cam marks the end of the rolling operation, which, for the customary type stock metal, usually takes twenty strokes of the rolling die.

The rolled type 30 (Figure 18) as it is formed by this process thus consists of a type-head 32 substantially complying in thickness and shape to the finished type-head 32 (Figures 3, 4, and 6) with a certain amount of excess material or flash projecting from the sides, in the form of wings 45, 46, lugs 39 and 40 molded at the ends of the type-head beneath the head; a shank 33 formed at the correct angle relative to the head and a gaging shoulder 43. The characters 44 in substantially their finished form are formed in relief on the face of the type-head. The type-bar is thrust endwise to abut against gage 43 when type is riveted to bar.

The continued rotation of the cam allows the frame 150 and the cam-roller 154 to rise by the reaction of spring 161 until it reaches the depressed surface 190 of the cam. During this period the pressure on the rolling die is entirely relieved and the rolling die is raised out of engagement with the rolled type 30, see Figure 13. At or about this point, the die-bed 118 is rotated through an angle of 90°, bringing the next die 50 from station B to station C under the rolling die, and the process is repeated.

With my invention, therefore, what ordinarily would require at least an operation to form the type-head and a rolling operation to form the characters is accomplished in one continuous operation by the combination of gradually applied vertical pressure and simultaneous oscillation to a rocking die.

After leaving station C, the next movement of the die-bed 118 brings the plunger 124 into contact with the ramp 125ᵃ of the cam-track 125. The sliding of the plunger on the cam-ramp causes the plunger to lift the die-head 55, thus freeing the rolled type 30 as seen in Figures 14 and 16. The opening of the die also lifts the just previously rolled type so that the flash 45 is now spaced from the die-bed 118. This action occurs before the die reaches station D.

During the rotation of the die-bed 118 and as the opened die 50 with the rolled type 30 therein approaches station D, the ejector 194 previously mentioned is brought into operative position, Figures 14 and 16, by the downward motion of arm 102, which by reason of its operative association with the timing gears 83 and 85 and sprocket 93 is synchronized with the movement of the die-bed 118. The machine end of the ejector 104 is provided with two pick-off fingers 105 and 106, the ends of which are curved and disposed in advance of station D. The fingers are formed at the ends of the plates 107 and 108 comprising the bottom of the ejector-channel 109. The ejector-finger 105 is in advance of the other finger and passes at one side of the type under the lifted flash 45 as the die 50 approaches station D. As the die 50 travels to its station D (see Figures 14 and 16) the right wing 45 of the rolled typehead 32 slides on to the inside finger 105 and rides up on it, bringing the rolled type 30 to a position where the shank 33 is practically clear of the die-space 63, see Figure 17. At approximately this point, the left wing 46 of the type-head 32, now clear of the lifted die-head, rides on to the outer finger 106 and before the die-bed 118 has stopped at station D, the rolled type 30 has been removed from the die 50, the wings 45 and 46 of the type-head resting on the channel-plates 107, 108 of the ejector 104 as shown in Figure 17. During the period in which the next type-blank is being rolled, the arm 102 is rocked upward about shaft 97, tilting the ejector upward, and the rolled type 30 slides by gravity along the channel 109 of the ejector and falls into a suitable receptacle 195. A proper curve is given the channel 109 to remove the rolled type in a direction of the shank 33, so that there is no interference during the rotation of the die-bed 118 to station D. It will be understood that the ejector may be removed from the bracket 103 for changing the ejector to co-operate with the type being rolled, as the direction in which the type-shank 33 is inclined from the perpendicular determines which of the two ejector-fingers 105 and 106 is to engage the type first, and also determines the curvature of the fingers 105 and 106.

In practice, four forms of ejector 104 are available. The pick-off finger under which the opened die-head 55 passes depends on whether a left-hand or a right-hand form of type 30 is being rolled, as previously explained, and one of the pick-off fingers must pass closely over the jaw of die 50, whereas the other must clear the opened die-head 55, as illustrated in Figures 16 and 17. The third and fourth forms of ejector 104 are used with those types in which the angle between the type-head 32 and shank 33 is nearly 90°, such as the centrally-disposed types.

The die 50 remains open as the next quarter turn of die-bed 118 brings die 50 again to station A, at which point a new blank 72 will be inserted.

While the above description is based upon one blank and die, passing from one station to the next, it is understood that the revolving die-bed 118 carries four or more dies 50, into each of which a blank 72 is inserted when reaching station A. The rolling operation is therefore almost continuous, with the entire operation automatic, with the exception of the initial insertion of the blank 72 into the die, which, although usually performed by hand, may be accomplished by the use of a conveyor.

The rolled type 30 (Figure 18) is then removed from the receptacle 195, and the type-head 32 is placed between jaws 201 and 202 of a vise 200, which is located on the wheel 203, Figure 20. The vise grips the gaging shoulder 43 and the lugs 39 and 40. The wheel 203 is mounted vertically on a revolving shaft 204, which is rotated intermittently by means of a power source (not shown). There are eight or more vises spaced equally about the circumference of the wheel 203, each vise accommodating one type. The type 30 is inserted in the vise 200 at the station E, Figure 20. When the vise containing the type 30 reaches the upper station F, the type-head 32 is under the center of the head of a scoring machine 205 which supports a vertical plunger 206 carrying two scoring tools 207 and 208, the space between which is substantially equal to the required width of the finished type-head 32. The scoring tools 207 and 208 form two parallel notches 209 on the sides of the type-head 32, as indicated in Figure 19. The space between the scoring tools 207 and 208 is occupied by a pad 210 which may be made of rubber or other compressible material. The rubber pad 210 is under compression during the scoring operation, and when the plunger 206 is raised, after the completion of the scoring operation, pad 210 expands and presses against the type-head 32 and holds the type 30 in position.

The rotation of the wheel brings the vise 200 to one of the lower stations H, when the scored type 30 will be pushed out of the vise 200 by means such as the ejector-bar 211 which co-operates with the plunger 206. A new rolled type 30 is then manually inserted when the vise 200 again reaches station E at the side of the wheel, and the operation continues. As there are eight or more vises on the wheel, the revolution of which is continuous, with the exception of the stops made for carrying out the scoring operation, this entire operation is therefore substantially continuous. Only one type of vise is used for all of the types, as the space between the jaws 201 and 202 accommodates the shanks 33 regardless of the angle between shank 33 and type-head 32.

After the scoring operation, the scored type 30 is placed in a vise 215, Figure 21. This vise consists of two jaws 216 and 217, the upper ends of which are shaped to form the clamping surfaces 218 and 219, which are located at the proper angle for clamping the shank 33 of the score type 30 to bring the type-head 32 into a substantially horizontal position. It is thus necessary to provide ten or more different sets of vises, depending upon the number of different angles required between the type-heads and shanks. After the type is inserted the vise is closed by means of a cam 220, which is actuated by a handle 221 or other suitable means.

A pair of revolving milling cutters 222 and 223 mounted on a horizontal shaft 224 and spaced a distance apart substantially equal to the required width of the type-head 32 travels across the type-head and straddle-mills the sides thereof. The wings 45 and 46 of the scored type 30, if not knocked off during the handling of the type after the scoring operation, will be removed during this milling operation.

The vise is then opened by means of the cam 220 and the handle 221, the milled type 30 removed and a new scored type 30 inserted.

The side milled type 30 is then placed in a suitable holding fixture, and a pair of revolving form cutters 225 and 226, Figure 22, beveled to the angle required and spaced the proper distance apart to accommodate the length of the type, travels across the face of the type 30.

Figure 6:
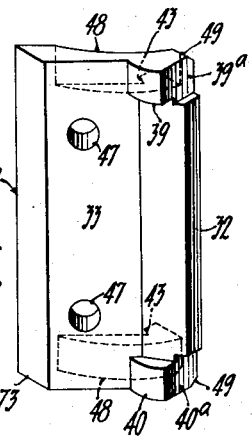
Figure 6 illustrates a completed type-head.

These cutters form the end bevels or chamfers 49, indicated on Figure 6.

The beveled type 30, Figure 23, is then placed in a suitable vise (not shown), the jaws of which clamp the shank 33 of the type in such a position that one side of the type-head 32 assumes the proper angular relation required for the correct milling of the guiding lugs 39 and 40, as at 39ª and 40ª, Figure 6. It is necessary to provide vises with ten or more clamping angles, depending upon the number of angles required between the type-head and the shank of the types in each machine.

A pair of milling cutters 227 and 228 mounted on a revolving shaft 228ª and spaced the required distance apart then travels across the side of the type-head 32 and mills the two guide-lugs 39 and 40 at the ends of the type.

The distance from the center of the type-head 32 to the edges of the lugs 39 and 40 is the same for all types, so that as the edges of the lugs strike the edges 41 of the notches in guide 37, the type will be brought into the correct printing-position of the platen 31.

After the lugs 39 and 40 are milled, the lug-milled type 30 is placed in a suitable punch-press (not shown) where the holes 47, Figure 6, are punched into the shank 33 for attaching the type 30 to the type-bar 34. Instead of punching, the holes may be drilled in a conventional drill-press using single or multiple drills.

After punching, the punched type 30 is placed between jaws 229 and 230 of a vise 231, as indicated in Figure 24. The jaws 229 and 230 of the vise have two faces 232 and 233 for gripping the shank 33 of the punched type 30. At the top of one of the jaws 230 there is a shoulder 234 which engages the shoulder 43 of the type 30 and maintains the type-head 32 in its correct position.

A pair of milling cutters 235 mounted on a revolving shaft (not shown), as indicated in Figure 24, and spaced the required distance apart, is brought against the type-head 32 in order to mill out the clearance 48 at both ends of the type 30. All of the types are clearance milled, but as the amount of clearance required varies with the different types, the movement of the cutters with relation to the type-head is adjusted to obtain the proper clearance. The same vise may be used for all types, regardless of the angle between the shank and head.

In the central types 36 and a similar set of types located adjacent to and at the opposite side of the center line X—X of the typewriter (a total of eight types in the average machine), the path of the type in traveling from its home position in the arc Z—Z to the platen 31 is very nearly perpendicular to the vertical plane of the platen, as in type 36, or the angle between the plane of the platen 31 and the shank 33 of the type is a few degrees less than 90°, depending upon the position of the type with relation to the center line X—X of the machine. In order to facilitate the movement of these central types when the sides of the central type-heads, as 36, come in contact with the edges 41 and 41ª of the notches 42 and 42ª in the center of the guide 37, the two ends at the side of these types are beveled slightly, as indicated at 49ª in Figures 3 and 25. The type is beveled at the side opposite the side on which the type is located with relation to the center line of the machine in its normal position. In other words, the type-bevel 49ª is on the side of the type which is gaged by the right-hand fixed gage 41 at Figure 3. But those types that are on the opposite side of the center line, may be beveled on the side which engages with the left-hand fixed gage 41.

To form these bevels 49ª, the clearance-milled type 30 is clamped in a holding fixture or vise 236, as indicated in Figure 25. A pair of milling cutters 237 mounted on a revolving horizontal shaft (not shown) and spaced the proper distance apart to provide the necessary clearance between the upper and lower notches 42 and 42ª of the guide 37 is used. These cutters 237 are brought against the side of the type 30, and the bevels 49ª are milled at the two ends of the type to the depth required.

The end-bevelled type 30 is placed in a holding device of a suitable character, and the holes 47 countersunk on one side of the shank 33. This countersinking operation is performed on all of the types, in the conventional manner on a drill-press or other suitable machine, using either a single or multiple countersink.

After countersinking the holes, burrs raised at various points on the types by the respective machining operations are removed by hand-filing in the conventional manner, using various sizes and shapes of files or abrasive material.

In order to facilitate the location of the types in assembling typewriters, some or all of them bear a distinguishing number. This number is either stamped or etched on one side of the shank 33.

The types, after the machining operations are completed, are then heat-treated in the conventional manner known to the art in order to harden them. The exact heat-treating process varies considerably depending upon the steel used in the blank and the hardness required in the types.

After they are finished the types are plated with chromium, cadmium or other suitable material. This plating is performed by using either an electroplating or other suitable process, to protect the surfaces of the type against corrosion.

While the sequence of operations indicated herein may be followed in the process of making the types described, the relationship of the machining steps to one another is such that this sequence may be altered in a number of ways depending upon the facility for handling the parts in the machine-shop. The steps may thus be rearranged, or two or more steps may be combined in one machine or set of machines, or be performed in one holding device, to produce the desired result, depending upon the judgment of those skilled in the art.

The invention is not confined to types used in typewriters, for the invention may be used in making types for computing, adding, recording, check-writing, and other machines.

The type-rolling motion hereinbefore described may also be described as a rocking motion, or a kneading motion, or other metal-working motion.

Variations may be resorted to within the scope of the invention, and portions of the improvements may be used without others.

Having thus described my invention, I claim:

1. In manufacturing a set of typewriter-types, each type having a face formed with a type-character, and also having a shank attachable to a type-carrier, the shanks severally being disposed, substantially as set forth, at different angles with a common printing-plane for the types; the method of forming the type-character on each type and at the same time establishing the companion shank-angle, said method including operating upon a type-blank, having such shank, with a type-character-forming device while holding said blank with said shank fixed at a certain angle to said character-forming device, the several certain angles at which the shanks of the blanks for the set of types are held and fixed relatively to the character-forming device being the same as the several different angles of the type-shanks with said common printing-plane.

2. In manufacturing a set of typewriter types, each type having a face formed with a type-character, and also having a shank attachable to a type-carrier, the shanks severally being disposed, substantially as set forth, at different angles with a common printing-plane for the types; the method of forming the type-character on each type and at the same time establishing the companion shank-angle, said method including operating upon a type-blank, having such shank, with a type-character-forming device while holding said blank in blank-receiving means arranged in a type-forming press to fix the shank at a certain angle to the character-forming device, the several certain angles at which the shanks of the blanks for the set of types are fixed relatively to the character-forming device being the same as the several different angles of the type-shanks with said common printing-plane.

3. In manufacturing a set of typewriter-types, each type having a face formed with a type-character, and also having a shank attachable to a type-carrier, the shanks severally being disposed, substantially as set forth, at different angles with a common printing-plane for the types; the method of forming the type-characters for the set of types and at the same time establishing, for each type, the companion shank-angle, said method including operating upon type-blanks, having such shanks, with type-character-forming devices while holding each blank in a type-blank receiver arranged to fix the shank of that blank at a certain angle to the character-forming device, said method including the use of a set of different angle-establishing type-blank-receivers, one type-blank receiver for each of the said different angles.

4. The method as set forth in claim 3, the set of types including certain pairs, in that the individual types of a pair have their shanks disposed at the same angle to said printing-plane but in opposite directions from the middle of the set of types, one blank-receiver being used for each such pair of types and being used reversibly to point the shanks of that pair in said opposite directions.

5. In manufacturing a set of typewriter types, each type having a head formed with a type-character and also having a single shank-forming fin, the shanks severally being disposed, substantially as set forth, at different angles with a common printing-plane for the types, each type also having underneath said head a pronounced boss-formation, such as 39, 40; the method of forming said types from a set of blanks, each blank having stock for the head and boss-formation, and also having such shank-fin appendant to said stock, said method including working upon said stock of a blank for each type with a character-forming stamp while holding the blank in a blank-receiving die arranged to fix said shank at a certain angle to said stamp, said die also being arranged and used as a matrix into which the stock is molded, by the character-forming pressure of said stamp, to produce said boss-formation, the said several angles by which the shanks of the blanks for the set of types are fixed relative to the character-forming stamps being the same as the several different angles of the type-shanks with said common printing-plane.

6. In manufacturing a set of typewriter-types, each type having a head formed with a type-character, and also having a single thin shank-fin, the shank-fins severally being disposed, substantially as set forth, at different angles with a common printing-plane for the types; the method in which uniform type-blanks, such as 72, are used to produce the diverse types of the set, each blank being in the form of a rod having a longitudinal thick section that constitutes stock for the head, the remainder of the rod being in the thin form of said shank-fin, said method including operating upon the stock of each blank with a type-character-forming stamp while holding said blank with said shank-fin fixed at a certain angle to said stamp, the several certain angles by which the shank-fins of the blanks for the set of types are fixed relatively to the stamp being the same as the several different angles of the type-shanks with said common printing-plane.

7. The method of producing type-blanks for a set of typewriter-types of the character described, each type having an elongated stick on one longitudinal side of which the type-character is formed, and also having a single shank-forming fin appendant as a thin flange along the under side of said stick, said method being directed to finishing the fin to its final thickness while producing the blank, and therefore including rolling or drawing type-blank material into a rod of L-shaped cross-section by suitable means devised to make one leg of the L of the finished thin cross-section dimension of said fin, and to make the other leg of the L as a thickened stock, such as 70, workable by means of stick and type-character-forming pressure dies while the fin is held at a certain angle in a die, the fins of the blanks for the several types of said set being held at diverse angles, as set forth.

8. The method of producing type-blanks for a set of typewriter-types of the character described, each type having an elongated stick on one longitudinal side of which the type-character is formed, and also having a single shank-forming fin appendant as a thin flange along the under side of said stick, said method being directed to finishing the fin to its final thickness while producing the blank, and therefore including rolling or drawing type-blank material into a rod of L-shaped cross-section by suitable means devised to make one leg of the L of the finished thin cross-section dimension of said fin, and to make the other leg of the L as a thickened stock, such as 70, workable by means of stick and type-character-forming pressure dies while the fin is held at a certain angle in a die, the fins of the blanks for the several types of said set being held at diverse angles, as set forth, said rod being rolled or drawn to a length affording a multiplicity of the type-blanks, said method including cutting up the rod of said length into said type-blanks.

EDWIN THORELL.